(12) United States Patent  (10) Patent No.: US 8,869,026 B2
Bellert  (45) Date of Patent: Oct. 21, 2014

(54) USING A LAYOUT ENGINE TO DISPLAY AN OVERFLOWED TEXTBOX

(75) Inventor: Darrell Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 561 days.

(21) Appl. No.: 12/916,471

(22) Filed: Oct. 29, 2010

(65) Prior Publication Data

US 2012/0110441 A1 May 3, 2012

(51) Int. Cl.
*G06F 17/00* (2006.01)
*G06F 17/21* (2006.01)

(52) U.S. Cl.
CPC ................................. *G06F 17/211* (2013.01)
USPC ............ 715/249; 715/243; 715/244; 715/245

(58) Field of Classification Search
CPC ................ G06F 17/211; G06F 17/212; G06F 17/30905; H04N 1/3875
USPC .................................. 715/243, 244, 245, 249
See application file for complete search history.

(56) References Cited

U.S. PATENT DOCUMENTS

| | | | |
|---|---|---|---|
| 6,256,650 B1 * | 7/2001 | Cedar et al. | 715/235 |
| 7,743,325 B2 * | 6/2010 | Berker et al. | 715/246 |
| 2005/0094207 A1 * | 5/2005 | Lo et al. | 715/505 |
| 2008/0077880 A1 * | 3/2008 | Oygard | 715/243 |
| 2009/0276697 A1 * | 11/2009 | Mielke et al. | 715/252 |
| 2010/0175021 A1 * | 7/2010 | Ferrara et al. | 715/784 |
| 2010/0269036 A1 * | 10/2010 | Berger et al. | 715/243 |
| 2010/0325529 A1 * | 12/2010 | Sun | 715/234 |

* cited by examiner

*Primary Examiner* — Adam M Queler
*Assistant Examiner* — Ariel Mercado
(74) *Attorney, Agent, or Firm* — Osha • Liang LLP (57) ABSTRACT

A method for managing electronic documents (EDs), including obtaining an ED defining an overflowed textbox with a vertical justification, a paragraph for the overflowed textbox, and a horizontal justification of the paragraph, where the paragraph comprises a plurality of characters, generating, based on the ED, an intermediate document (ID) defining an enlarged textbox encapsulating the paragraph with the horizontal justification, calculating, using the layout engine and based on the ID, a plurality of positions of the plurality of characters within the enlarged textbox by generating an intermediate page including the enlarged textbox, calculating, based on a vertical justification of the overflowed textbox, a transformation between a point of interest (POI) associated with the enlarged textbox on the intermediate page and a reference point associated with the overflowed textbox, and generating a rendered page of the ED by applying the transformation to the plurality of positions of the plurality of characters.

20 Claims, 7 Drawing Sheets

System 100

USING A LAYOUT ENGINE TO DISPLAY AN OVERFLOWED TEXTBOX

BACKGROUND

Although the demand for printing electronic documents (EDs) is decreasing because of recent improvements in computer displays, there are still those who generate hardcopies of EDs for purposes of reading the EDs. For example, some readers may simply prefer reading a hardcopy over staring at a computer screen. In other instances, hardcopies of the EDs may be provided to a group of people at an informal presentation, or in other situations where reading from a projector screen or computer display is not convenient.

An ED may specify any number of pages having both confined textboxes (i.e., a textbox where all characters of the associated paragraphs are within the perimeter of the textbox) and overflowed textboxes (i.e., a textbox where at least one character of the associated paragraphs is positioned outside the perimeter of the textbox). Accordingly, the ED includes the positions, dimensions, text (i.e., strings, paragraphs), horizontal justifications of each paragraph, and vertical justification of the textbox for each textbox. It is the responsibility of a Page Rendering Device (PRD) to layout the textboxes and the paragraphs as specified by the ED.

In general, standard layout engines within PRDs are well configured to process confined textboxes. However, overflowed textboxes present non-trivial problems for these layout engines. Despite the potential problems for the layout engines, users still wish to create EDs with overflowed textboxes and use existing layout engines to process the EDs.

SUMMARY

In general, in one aspect, the invention relates to a method for managing electronic documents (EDs), comprising obtaining an ED defining an overflowed textbox with a vertical justification, a paragraph for the overflowed textbox, and a horizontal justification of the paragraph, wherein the paragraph comprises a plurality of characters, generating, based on the ED and for input to a layout engine, an intermediate document (ID) defining an enlarged textbox encapsulating the paragraph with the horizontal justification, calculating, using the layout engine and based on the ID, a plurality of positions of the plurality of characters within the enlarged textbox by generating an intermediate page comprising the enlarged textbox, calculating, based on a vertical justification of the overflowed textbox, a transformation between a point of interest (POI) associated with the enlarged textbox on the intermediate page and a reference point associated with the overflowed textbox, and generating a rendered page of the ED by applying the transformation to the plurality of positions of the plurality of characters.

In general, in one aspect, the invention relates to a non-transitory computer readable storage medium storing instructions for managing electronic documents (EDs), the instructions comprising functionality to obtain an ED defining an overflowed textbox with a vertical justification, a paragraph for the overflowed textbox, and a horizontal justification for the paragraph within the overflowed textbox, wherein the paragraph comprises a plurality of characters, generate, based on the ED and for input to a layout engine, an intermediate document (ID) defining an enlarged textbox encapsulating the paragraph with the horizontal justification, calculate, using the layout engine and based on the ID, a plurality of positions of the plurality of characters within the enlarged textbox by generating an intermediate page comprising the enlarged textbox, calculate, based on a vertical justification of the overflowed textbox, a transformation between a point of interest (POI) associated with the enlarged textbox on the intermediate page and a reference point associated with the overflowed textbox, and generate a rendered page of the ED by applying the transformation to the plurality of positions of the plurality of characters.

In general, in one aspect, the invention relates to a system for managing electronic documents (EDs), comprising a hardware processor; a converter module executing on the hardware processor and configured to obtain an ED defining an overflowed textbox with a vertical justification, a paragraph for the overflowed textbox, and a horizontal justification for the paragraph within the overflowed textbox, wherein the paragraph comprises a plurality of characters, and generate, based on the ED and for input to a layout engine, an intermediate document (ID) defining an enlarged textbox encapsulating the paragraph with the horizontal justification; a layout engine executing on the hardware processor and configured to calculate a plurality of position of the plurality of characters within the enlarged textbox by generating an intermediate page comprising the enlarged textbox; and a mapping engine executing on the hardware processor and configured to calculate, based on a vertical justification of the overflowed textbox, a transformation between a point of interest (POI) associated with the enlarged textbox on the intermediate page and a reference point associated with the overflowed textbox, wherein the layout engine is further configured to generate a rendered page of the ED by applying the transformation to the plurality of positions of the plurality of characters.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing electronic documents (EDs). Specifically, one or more overflowed textboxes within an ED are replaced with enlarged textboxes. A layout engine processes the enlarged textboxes and calculates the positions (i.e., coordinates) of the characters within the enlarged textboxes. A rendered page is generated by relocating the characters according to a transformation linking the enlarged textbox and the overflowed textbox.

Figure 1:
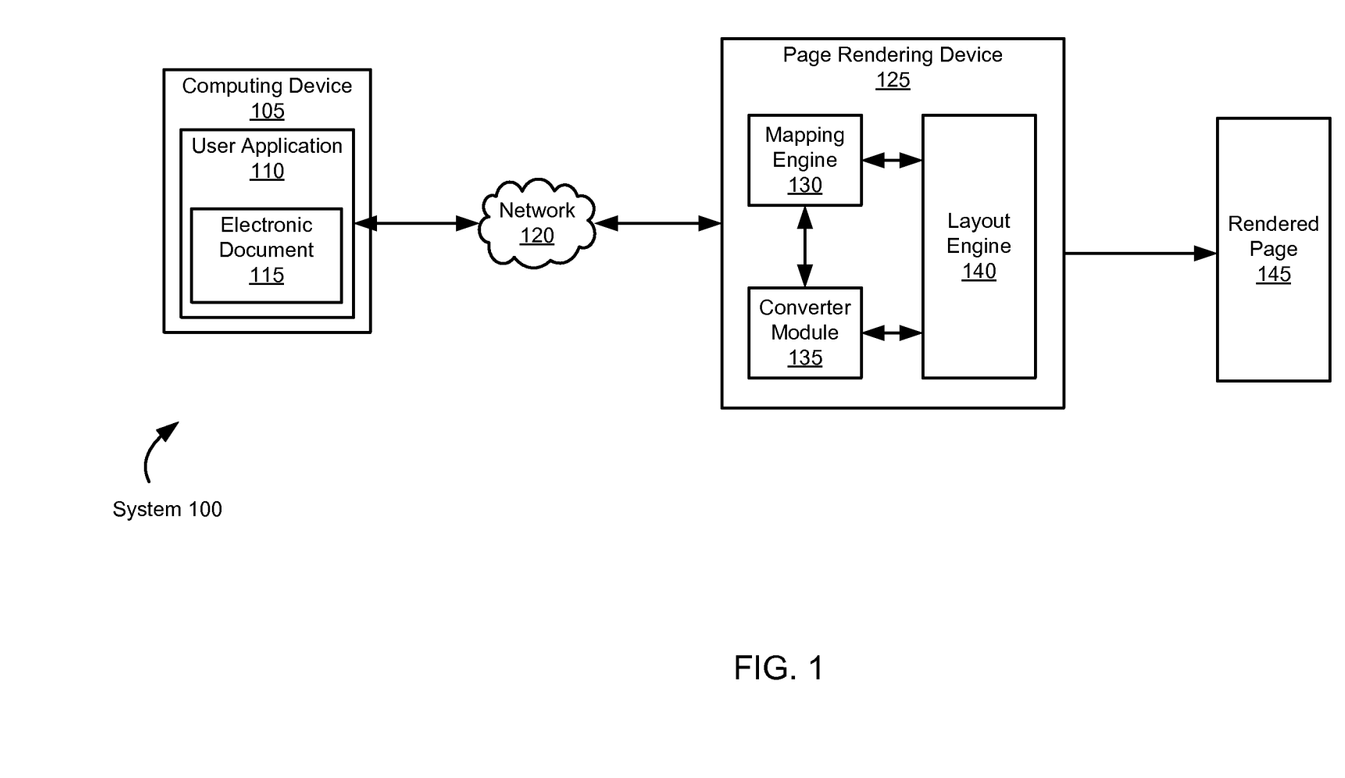
FIG. 1 shows a system in accordance with one or more embodiments of the invention.

FIG. 1 shows a system (100) in accordance with one or more embodiments of the invention. As shown in FIG. 1, the system (100) has multiple components including a page rendering device (PRD) (125) and a computing device (105). The PRD (125) may be, for example, a printer, an electronic reader, etc. The computing device (105) may be a personal computer (PC), a desktop computer, a mainframe, a server, a telephone, a kiosk, a cable box, a personal digital assistant (PDA), a mobile phone, a smart phone, etc. There may be a direct connection (e.g., universal serial bus (USB) connection) between the computing device (105) and the page rendering device (125). Alternatively, the computing device (105) and the page rendering device (125) may be connected using a network (120) having wired and/or wireless segments.

In one or more embodiments of the invention, the PRD (125) is located on the computing device (105). In such embodiments, the PRD (125) may correspond to any combination of hardware and software on the computing device (105) for generating a rendered page (145) of an ED.

In one or more embodiments of the invention, the computing device (105) executes the user application (110). The user application (110) is a software application operated by a user and configured to obtain, input, generate, display and/or print an ED (e.g., Electronic Document (115)) having any number of pages. Accordingly, the user application (110) may be a word-processing application, a spreadsheet application, a desktop publishing application, a graphics application, a photograph printing application, an Internet browser, etc. The user application (110) may generate new EDs and/or obtain previously saved EDs. In one or more embodiments of the invention, the ED (115) includes one or more overflowed textboxes (discussed below).

Figure 2:
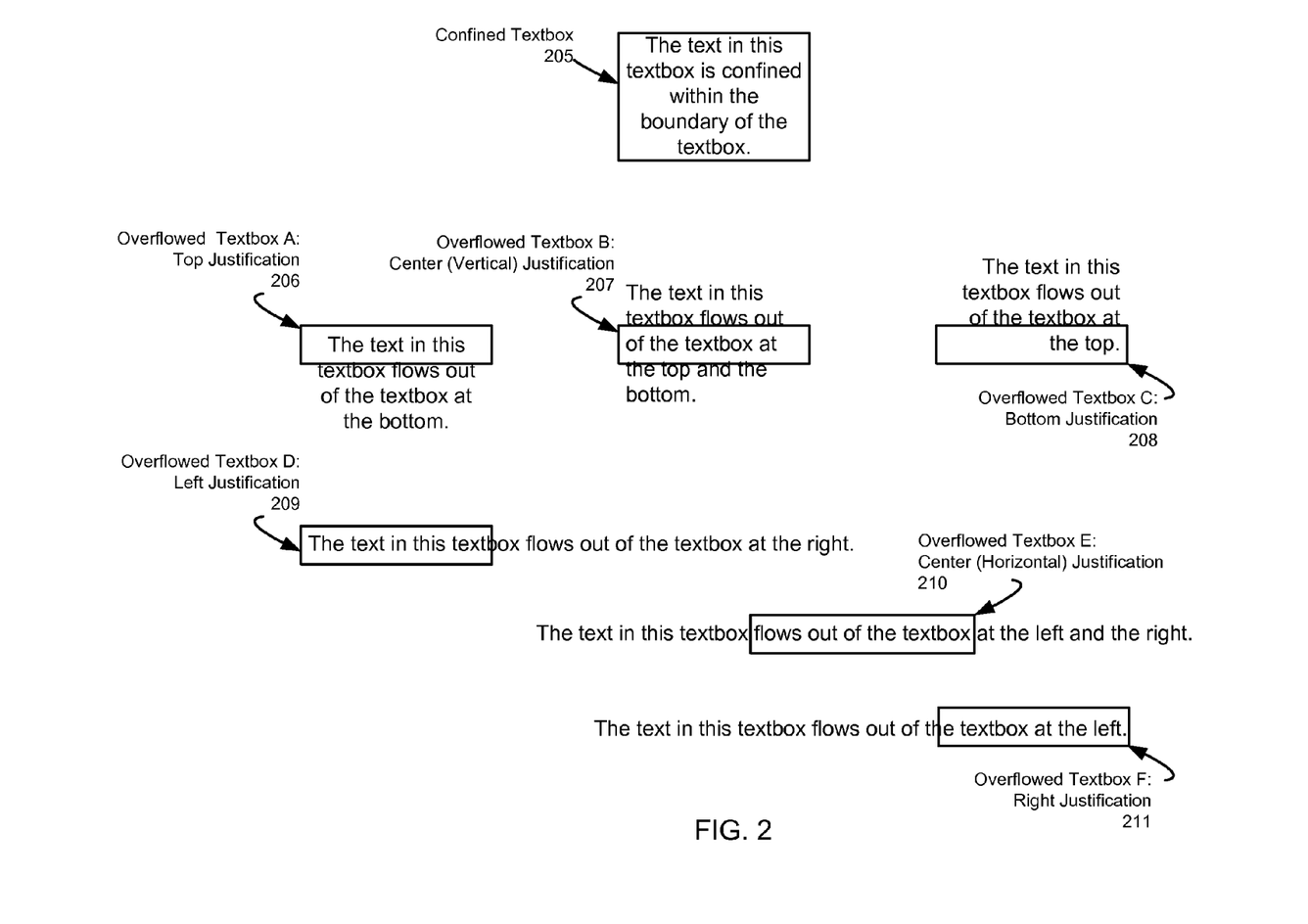
FIGS. 2 and 4 show multiple textboxes in accordance with one or more embodiments of the invention.

FIG. 2 shows multiple textboxes (205-211) in accordance with one or more embodiments of the invention. Any of the textboxes (205-211) shown in FIG. 2 may exist on one or more pages of an ED (e.g., ED (115), discussed above in reference to FIG. 1).

In one or more embodiments of the invention, each textbox (205-211) has a single vertical justification and contains one or more paragraphs or strings, and each paragraph or string has a horizontal justification. In the vertical direction, all text in the textbox may have a top justification, a center justification, or a bottom justification with respect to the textbox. In the horizontal direction, each paragraph may have a left justification, a center justification, or a right justification with respect to the textbox. For example, a single textbox may have a top vertical justification with one paragraph set with a left horizontal justification and a second paragraph set with a right horizontal justification.

In one or more embodiments of the invention, the paragraph(s) of the confined textbox (205) is/are restricted to the boundary of the textbox. In other words, all characters of the paragraph(s) are positioned within the perimeter of the confined textbox (205). Each paragraph may have any justification, as long as it completely inside the confined textbox (205).

In one or more embodiments of the invention, an overflowed textbox (206-211) includes text that spills outside of the textbox's perimeter. In other words, the overflowed textbox is too small for the text and one or more characters of the paragraph(s) are positioned outside of the perimeter of the overflowed textbox (206-211).

The overflowed textbox A (206) has a top vertical justification. Accordingly, the first line of the paragraph is within the overflowed textbox A (206) and aligned with the top of the overflowed textbox A (206). However, as the overflowed textbox A (206) is too small for the text, at least some of the final line of the text is outside and below the overflowed textbox A (206).

The overflowed textbox B (207) has a center vertical justification. Accordingly, the text is vertically centered within the overflowed textbox B (207). However, as the overflowed textbox B (207) is too small for the text, at least some of the first line of the text is outside and above the overflowed textbox B (207), and at least some of the last line of the text is outside and below the overflowed textbox B (207).

The overflowed textbox C (208) has a bottom vertical justification. Accordingly, the final line of the text is within the overflowed textbox C (208) and aligned with the bottom of the overflowed textbox C (208). However, as the overflowed textbox C (208) is too small for the text, at least some of the initial line of the text is outside and above the overflowed textbox C (208).

The overflowed textbox D (209) has a paragraph with a left justification. Accordingly, the paragraph is aligned with the left side of the overflowed textbox D (209). However, as the overflowed textbox D (209) is too small for the paragraph, at least a portion of the paragraph is outside and to the right of the overflowed textbox D (209).

The overflowed textbox E (210) has a paragraph with a center (horizontal) justification. Accordingly, the paragraph is horizontally centered within the overflowed textbox E (210). However, as the overflowed textbox E (210) is too small for the paragraph, at least a portion of the paragraph is outside and to the left of the overflowed textbox E (210), and at least a portion of the paragraph is outside and to the right of the overflowed textbox E (210).

The overflowed textbox F (211) has a paragraph with a right justification. Accordingly, the paragraph is aligned with the right side of the overflowed textbox F (211). However, as the overflowed textbox F (211) is too small for the paragraph, at least a portion of the paragraph is outside and to the left of the overflowed textbox F (211).

Referring back to FIG. 1, in one or more embodiments of the invention, the ED (115) is represented/defined using a document markup language (e.g., ODF, OOXML, etc.). Accordingly, the positions (i.e., coordinates) and/or dimensions (i.e., height, width) of overflowed textboxes, the paragraphs associated with the overflowed textboxes, and the justification of the paragraphs may be recorded as attributes within the tags of the document markup language.

As shown in FIG. 1, the PRD (125) includes the layout engine (140). In one or more embodiments of the invention, the layout engine (140) is configured to calculate the positions/placement of the columns, textboxes, paragraphs, sentences, words, characters, subheadings, subtitles, images, etc. of the ED (115) on a readable medium (e.g., paper, transparencies, microfilm, computer monitor, an electronic reader, etc.). In one or more embodiments of the invention, the layout engine (140) is configured to calculate the position (i.e., coordinates) of the characters of the paragraph(s) in a textbox described by the ED (115). In such embodiments, the output of the layout engine (140) is an intermediate page and the positions (i.e., coordinates) of the characters within the intermediate page. The perimeter (i.e., boundary) of the intermediate page corresponds to the perimeter (i.e., boundary) of the textbox. In some cases, when text flows outside the textbox, the intermediate page may be larger than the perimeter of the textbox.

In one or more embodiments of the invention, the converter module (135) is configured to transform (i.e., convert) the ED (115) into an intermediate form (e.g., an intermediate document (ID)) suitable for consumption by the layout engine (140). In one or more embodiments of the invention, transformation (i.e., conversion) of the ED (115) includes creating an enlarged textbox for any overflowed textbox defined in the ED (115) and replacing (i.e., substituting) the overflowed textbox in the ID with the enlarged textbox. The enlarged textbox is sufficiently large to encapsulate the entire text of the overflowed textbox. Accordingly, the enlarged textbox may exceed the overflowed textbox in height and/or width. The justification of the paragraph(s) is the same for both the overflowed textbox and the enlarged textbox.

In one or more embodiments of the invention, a horizontally enlarged textbox within the ID includes a spacing command added by the converter module (135). The spacing command forces the layout engine (140) to insert a predetermined amount of horizontal space before or after each paragraph within the enlarged textbox depending on the justification of the paragraph. In one or more embodiments of the invention, the layout engine (140) is a TeX engine. In such embodiments, the spacing command for inserting horizontal space before a paragraph is the "\hskip" command, while the spacing command for inserting horizontal space after the paragraph is the "\parfillskip" command.

In one or more embodiments of the invention, the mapping engine (130) is configured to calculate a transformation between the positions of the characters within the intermediate page (i.e., enlarged textbox), as outputted by the layout engine (140) (discussed above), and the corresponding positions of the characters in the overflowed textbox. Specifically, the transformation is calculated based on the relationship of a point of interest (POI) associated with the enlarged textbox and a corresponding reference point associated with the overflowed textbox in the ED (discussed below). Both the POI and the corresponding reference point are selected based on the vertical justification of the textbox (i.e., top, center, or bottom).

Figure 3:
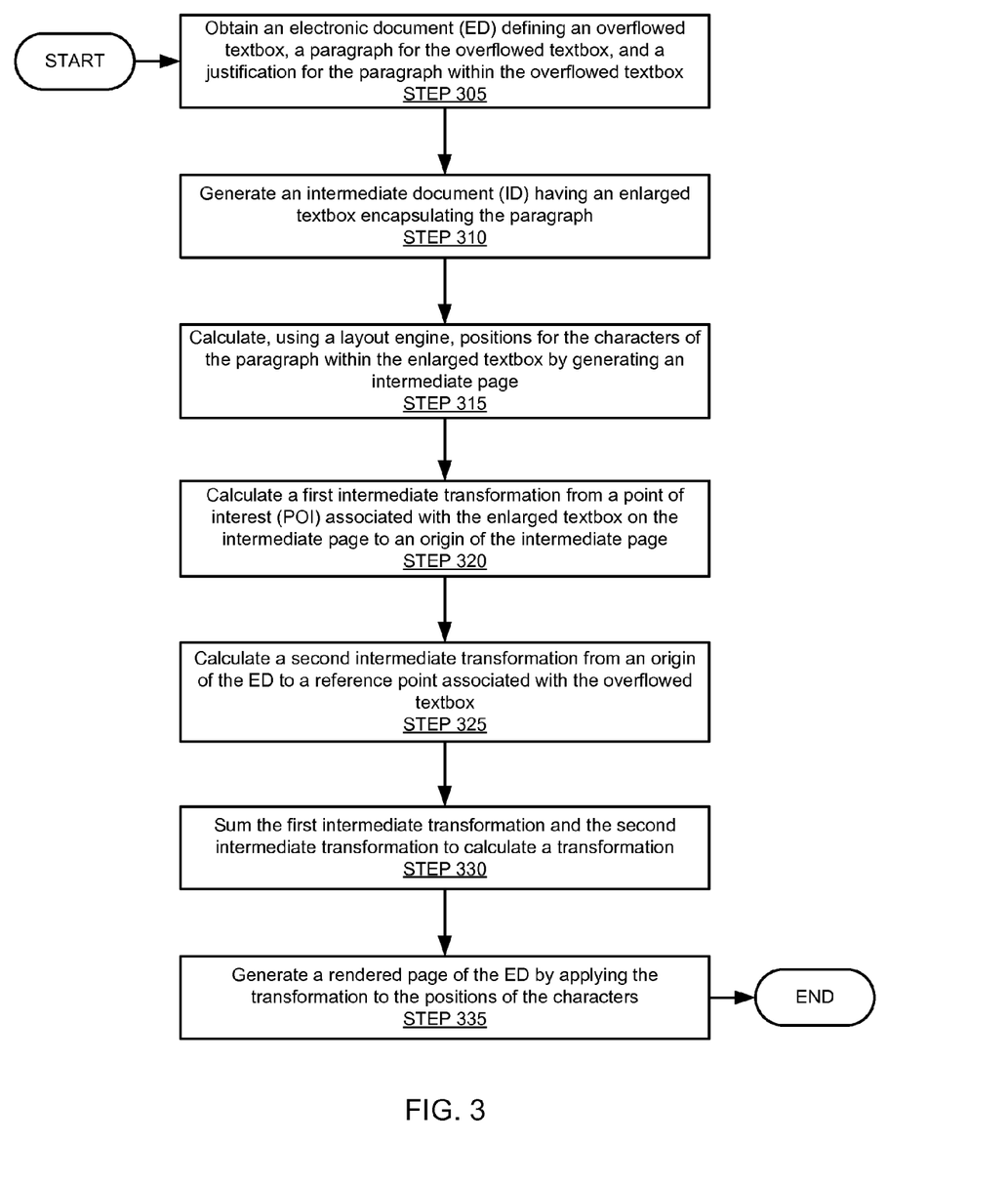
FIG. 3 shows a flowchart in accordance with one or more embodiments of the invention.

FIG. 3 shows a flowchart in accordance with one or more embodiments of the invention. The process shown in FIG. 3 may be used, for example, with the system (100) (e.g., PRD (125)) discussed above in reference to FIG. 1, to manage an ED. The sequence of steps shown in FIG. 3 may differ among embodiments of the invention, and one or more of the steps may be performed in parallel and/or may be optional.

In STEP 305, an electronic document (ED) is obtained. Specifically, the ED defines an overflowed textbox, one or more paragraphs for the overflowed textbox, and a justification for each paragraph within the overflowed textbox. As detailed in FIG. 2, the textbox may be justified according to various configurations, including top justified, center justified (along the vertical axis), and bottom justified. In addition, each paragraph may be justified according to various configurations, including left justified, center justified (along the horizontal axis), and right justified. Further, both the position (i.e., coordinates) and the dimensions (i.e., width, height) of the overflowed textbox may be defined in the ED.

In STEP 310, an intermediate document (ID) is generated. Specifically, the ID is generated by replacing the overflowed textbox with an enlarged textbox encapsulating the entire text. If the text overflows the overflowed textbox vertically, then the enlarged textbox will be expanded in the vertical direction. In other words, if the text only overflows the overflowed textbox vertically, the enlarged textbox and the overflowed textbox will have the same widths but different heights. If the text overflows the overflowed textbox horizontally (i.e., no word wrap), then the enlarged textbox will be expanded in the horizontal direction. In other words, if the text only overflows the overflowed textbox horizontally, the enlarged textbox and the overflowed textbox will have the same heights but different widths. If the text overflows the overflowed textbox both horizontally and vertically, the enlarged textbox will be expanded in both the vertical and horizontal direction. In other words, if the text overflows the overflowed textbox both horizontally and vertically, the enlarged textbox and the overflowed textbox will have different widths and different heights. The justification of each paragraph is the same in both the overflowed textbox and the enlarged textbox.

In STEP 315, positions (i.e., coordinates) for the characters of the paragraph(s) within the enlarged textbox are calculated by a layout engine (e.g., Layout Engine (140)). Specifically, the layout engine generates an intermediate page corresponding to the enlarged textbox and calculates the position for the characters within the intermediate page (i.e., enlarged textbox). If the text box is overflowed horizontally, then spacing commands must be added corresponding to the justification of the paragraph.

In one or more embodiments of the invention, when the text overflows an overflowed textbox horizontally, the ID includes one or more spacing commands to insert space before or after each paragraph within the enlarged textbox. The inserted spaces ensure a paragraph in the overflowed textbox and the corresponding paragraph in the enlarged textbox have the same relationship with the center of their respective textboxes. This may be necessary for successful application of the transformation (discussed below).

Figure 4:
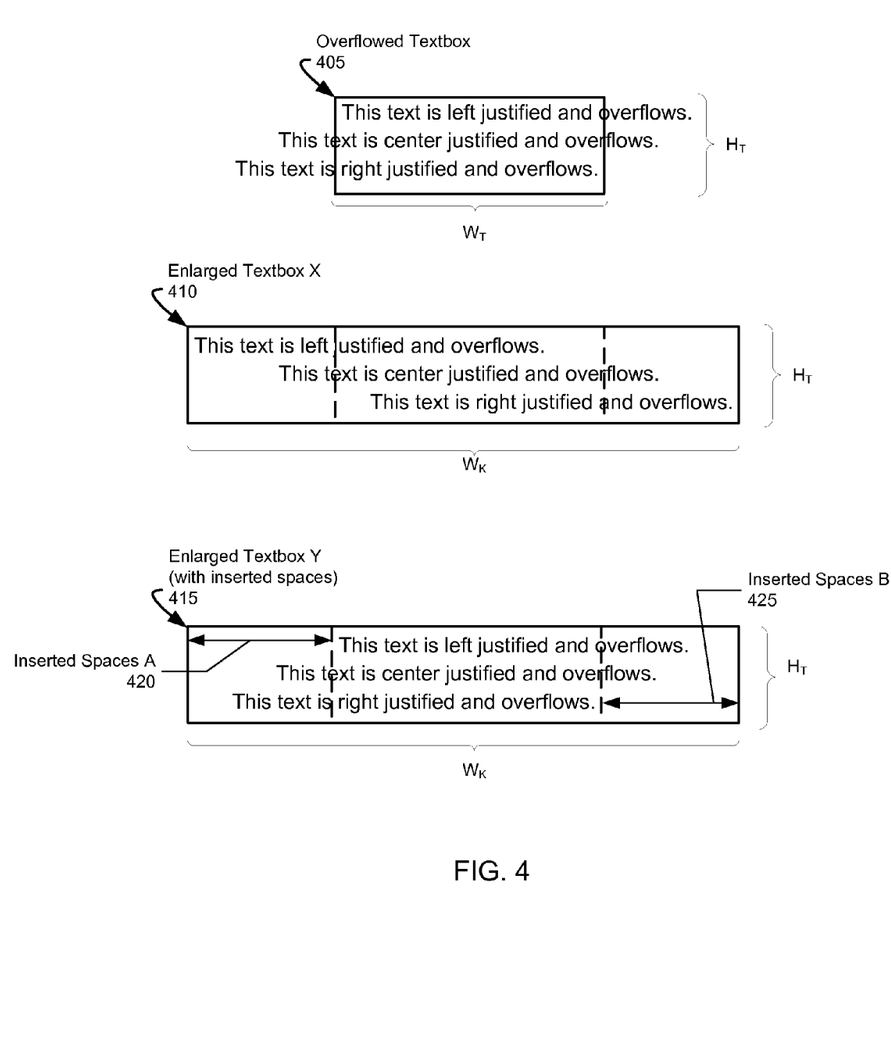

For example, FIG. 4 shows an overflowed textbox (405) in accordance with one or more embodiments of the invention. As shown in FIG. 4, the overflowed textbox (405) has a width of $W_T$, a height of $H_T$, and three paragraphs, each with a different horizontal justification (i.e., left justification, center (horizontal) justification, right justification). FIG. 4 also includes the enlarged textbox X (410) corresponding to the overflowed textbox (405) and having a width of $W_K$ and a height of $H_T$. The enlarged textbox X (410) has the same paragraphs as the overflowed textbox (405), and the paragraphs in the enlarged textbox X (410) have the same justifications in comparison to the overflowed textbox (405).

Consider the left justified paragraph in the overflowed textbox (405) and the left justified paragraph in the enlarged textbox X (410). Although both paragraphs are left justified, the two paragraphs do not have the same relationship with the center of their respective textboxes. Similarly, consider the right justified paragraph in the overflowed textbox (405) and the right justified paragraph in the enlarged textbox X (410). Although both paragraphs are right justified, the two paragraphs do not have the same relationship with the center of their respective textboxes.

FIG. 4 also includes the enlarged textbox Y (415) corresponding to the overflowed textbox (405) and having a width of $W_K$ and a height of $H_T$. The enlarged textbox Y (415) has the same paragraphs as the overflowed textbox (405). The enlarged textbox Y (415) is essentially the same as the enlarged textbox X (410), except spaces have been inserted (i.e., using a spacing command) before the left justified paragraph (i.e., Inserted Spaces A (420)) and spaces have been inserted (i.e., using a spacing command) after the right justified paragraph (i.e., Inserted Spaces B (425)). The inserted spaces (420, 425) correspond to a distance of $(W_K - W_T)/2$.

Consider the left justified paragraph in the overflowed textbox (405) and the left justified paragraph in the enlarged textbox Y (415). As a result of the inserted spaces A (420) both paragraphs have the same relationship with the center of their respective textboxes. Similarly, consider the right justified paragraph in the overflowed textbox (405) and the right justified paragraph in the enlarged textbox Y (415). As a result of the inserted spaces B (425), both paragraphs have the same relationship with the center of their respective textboxes.

Those skilled in the art, having the benefit of this detailed description, will appreciate that a paragraph that is center (horizontal) justified does not require the insertion of any spaces either before or after the paragraph. In other words, the center (horizontal) justified paragraph in the overflowed textbox (405), and the corresponding center (horizontal) justified paragraph in the enlarged textboxes (410, 415) have the same relationship with the centers of their respective textboxes. The enlarged textboxes (410, 415) change the position(s) of the center justified text from the overflowed textbox (405) so that it remains centered within the enlarged textboxes (410, 415).

Referring back to FIG. 3, in STEPS 320, 325, and 330, a transformation between a point of interest (POI) on the intermediate page (i.e., enlarged textbox) and a corresponding reference point on the overflowed textbox is calculated. The POI and corresponding reference point are selected depending on the vertical justification of the textbox. Specifically, if the textbox has a top justification, the POI is the top center of the enlarged textbox (i.e., intermediate page) and the corresponding reference point is the top center of the overflowed textbox. If the textbox has a bottom justification, the POI is the bottom center of the enlarged textbox and the corresponding reference point is the bottom center of the overflowed textbox. If the textbox has a center (vertical) justification, the POI is the center of the enlarged textbox and the corresponding reference point is the center of the overflowed textbox.

In one or more embodiments of the invention, the transformation between the POI associated with the enlarged textbox and the corresponding reference point associated with the overflowed textbox is calculated as two transformations. In STEP 320, the first transformation is calculated. Specifically, the first transformation is from the POI to the origin of the intermediate page. For example, if the textbox is top justified, and the origin of the intermediate page is the top left corner, then the first transformation may have the equation of $-0.5*W_K$ on the x axis, where $W_K$ is the width of the enlarged textbox, and 0 on the y axis. This corresponds to a Cartesian coordinate move of $(-0.5*W_K, 0)$.

In STEP 325, the second transformation is calculated. Specifically, the second transformation is from the origin of the ED to the reference point associated with the overflowed textbox. For example, if the textbox is top justified, then the second transformation may have the mathematical equation of $X+0.5*W_t$ on the x axis, where X is the x Cartesian coordinate of the top left corner of the overflowed textbox, as specified in the ED, and $W_t$ is the width of the overflowing textbox, as specified in the ED; and Y on the y axis, where Y is the y Cartesian coordinate of the top left corner of the overflowing textbox, as specified in the ED.

In STEP 330, the transformation is calculated by vector summing the first transformation and the second transformation. For example, if the textbox is top justified, then the transformation may have the mathematical equation of $-0.5*W_K+X+0.5*W_t$ on the X axis, and Y on the y axis. This corresponds to a Cartesian coordinate move of $(-0.5*W_K+X+0.5*W_T, Y)$. As discussed above, in cases where the text only vertically overflows the overflowed textbox, $W_k=W_t$ and the transformation simplifies. Continuing our example of top justified text, the Cartesian coordinate move is reduced to (X, Y).

In STEP 335, a rendered page of the ED is generated. Generating the rendered page includes applying the transformation to the positions of the characters within the enlarged textbox. In other words, the rendered page includes the characters in the positions resulting from the transformation. The rendered page will include the overflowed textboxes described in the ED.

Figure 5A:
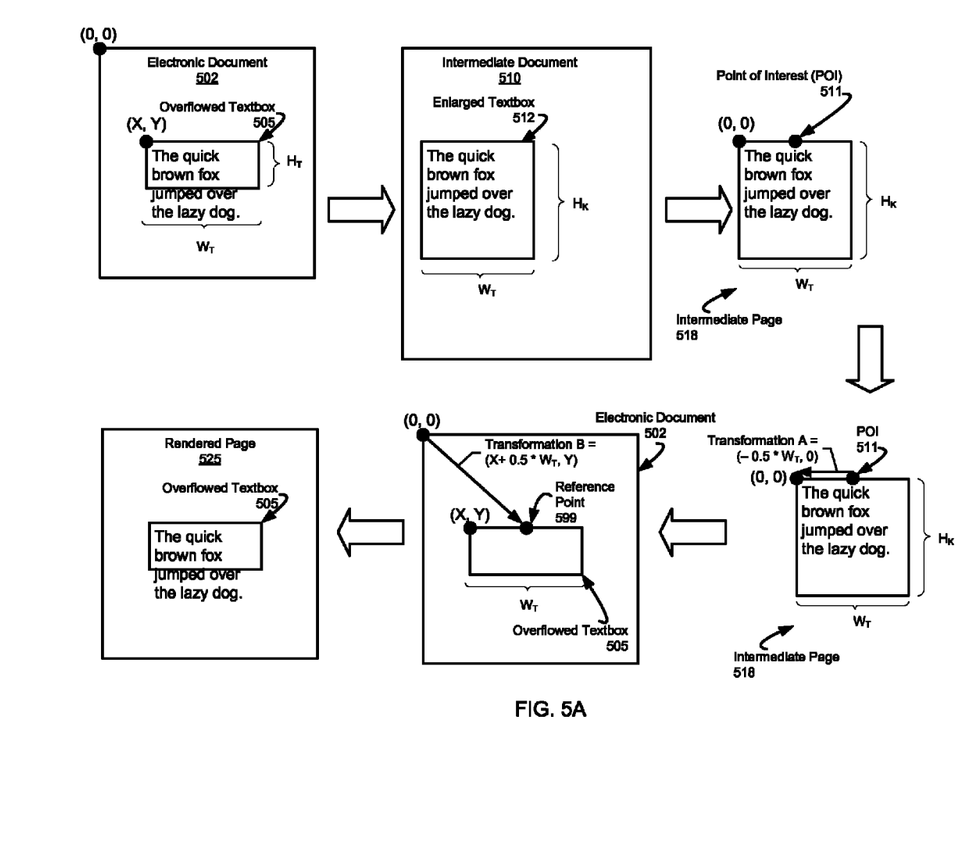
FIGS. 5A and 5B show examples in accordance with one or more embodiments of the invention.

FIG. 5A shows an example in accordance with one or more embodiments of the invention. As shown in FIG. 5A, the ED (502) has a vertically overflowed textbox (505) positioned at (X, Y), with a height of $H_T$ and a width of $W_T$. The overflowed textbox (505) is top justified and the paragraph in the overflowed textbox (505) is left justified.

In the ID (510) corresponding to the ED (502), the overflowed textbox (505) is replaced with the enlarged textbox (512) having a height of $H_K$ and a width of $W_T$. As the text is only overflowing vertically in the overflowed textbox (505), both the enlarged textbox (512) and the overflowed textbox (505) have the same width $W_T$. The enlarged textbox (512) is taller than the overflowed textbox (505) (i.e., $H_K>H_T$) and encapsulates the entire paragraph. The vertical justification of the textbox and paragraph is the same in both the enlarged textbox (512) and the overflowed textbox (505) (i.e., top justified and left justified, respectively).

The intermediate page (518) is generated by a layout engine in response to the ID (510). The intermediate page (518) corresponds to the enlarged textbox (512) and includes calculated positions for all characters of the paragraph. As the overflowed textbox (505) has a top justification, the point of interest (POI) (511) associated with the enlarged textbox (512) is the top center of the intermediate page (518).

The origin of intermediate page (518) is at the Cartesian coordinates (0, 0). A mapping engine may calculate a first transformation (i.e., Transformation A) from the POI (511) to the origin. In this case, the first transformation is $-0.5*W_T$, or a movement across half of the width of intermediate page (518) in the negative (i.e., towards the origin, left) direction.

The mapping engine may also calculate a second transformation (i.e., Transformation B) from the origin to the corresponding reference point (599) associated with the overflowed textbox (505). As discussed above, as the textbox is top justified, the corresponding reference point (599) is the top center of the overflowed textbox (505). In this case, the second transformation is $X+0.5*W_T$ on the x axis, or a movement to the X coordinate of the overflowed textbox (505), plus half of the width of the overflowed textbox (505) in the positive (i.e. away from the origin, right) direction. On the Y axis, the second transformation is Y, or a movement to the Y coordinate of the overflowed textbox (505).

The rendered page (525) is generated, in part, by vector summing transformation A and transformation B, and applying the resulting transformation to the positions (i.e., coordinates) of the characters in the intermediate page (518). In other words, the transformation relocates the characters in the intermediate page (518) into the positions matching the electronic document (505).

Figure 5B:
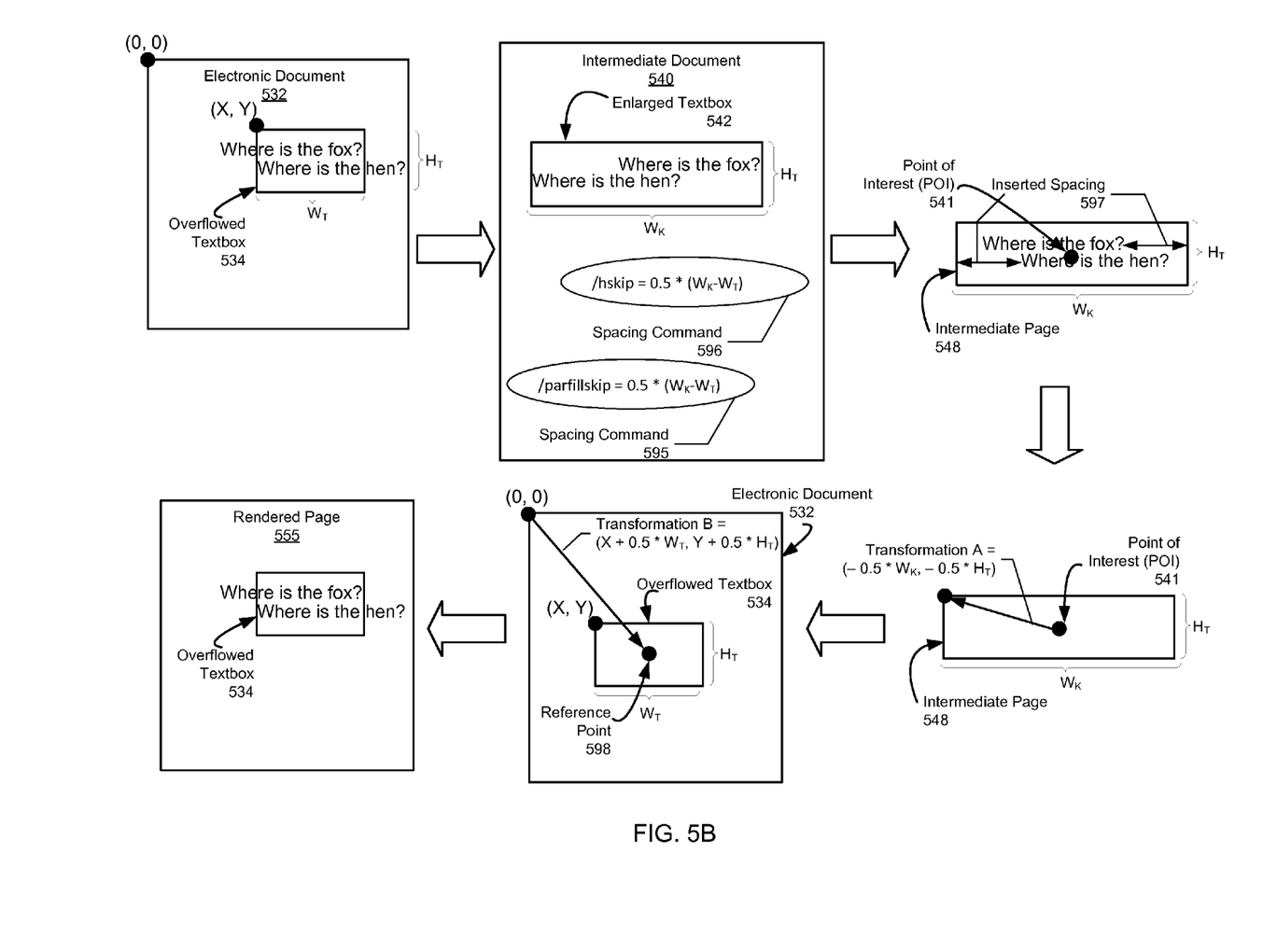

FIG. 5B shows an example in accordance with one or more embodiments of the invention. As shown in FIG. 5B, the ED (532) has a horizontally overflowed textbox (534) positioned at (X, Y), with a height of $H_T$ and a width of $W_T$. The overflowed textbox (534) is center (vertical) justified and the first paragraph "Where is the fox?" in the overflowed textbox (534) is right justified. The second paragraph "Where is the hen?" in the overflowed textbox (534) is left justified.

In the ID (540) corresponding to the ED (532), the overflowed textbox (534) is replaced with the enlarged textbox (542) having a height of $H_T$ and a width of $W_K$. As the text is only overflowing horizontally in the overflowed textbox (534), both the enlarged textbox (542) and the overflowed textbox (534) have the same height $H_T$. The enlarged textbox (542) is wider than the overflowed textbox (534) (i.e., $W_K > W_T$) and encapsulates both the first and the second paragraphs. The justification of the textbox and the paragraphs are the same in both the enlarged textbox (542) and the overflowed textbox (534) (i.e., the textbox is center vertical justified, the first paragraph is right horizontal justified, and the second paragraph is left horizontal justified). The ID (540) also includes spacing commands (595) and (596) to insert spaces after the first paragraph and before the second paragraph, respectively. The amount of space inserted after the first paragraph and before the second paragraph is equal to half the difference between the width of the enlarged textbox (542) and the overflowed textbox (534).

The intermediate page (548) is generated by a layout engine based on the ID (540) including the spacing commands (595) and (596). The intermediate page (548) corresponds to the enlarged textbox (542) and includes calculated positions for all characters of the first and second paragraphs. The intermediate page (548) also includes inserted spacing (597) corresponding to the spacing commands (595) and (596). As the overflowed textbox (534) has a center (vertical) justification, the point of interest (POI) (541) associated with the enlarged textbox (542) is the center of the intermediate page (548).

The origin of intermediate page (548) is at the Cartesian coordinates (0, 0). A mapping engine may calculate a first transformation (i.e., Transformation A) from the POI (541) to the origin. In this case, the first transformation is ($-0.5*W_K$, $-0.5*H_T$) or a movement across half of the width of intermediate page (548) in the negative (i.e., towards the origin, left) direction, and a movement across half the height of the intermediate page (548) in the negative (i.e., towards the origin, up) direction.

The mapping engine may also calculate a second transformation (i.e., Transformation B) from the origin to the corresponding reference point (598) associated with the overflowed textbox (534). As discussed above, as the textbox is center (vertical) justified, the corresponding reference point (598) is the center of the overflowed textbox (534). In this case, the second transformation is $X+0.5*W_T$ on the x axis, or a movement to the X coordinate of the overflowed textbox (505), plus half of the width of the overflowed textbox (534) in the positive (i.e. away from the origin, right) direction. On the Y axis, the second transformation is $Y+0.5*H_T$, or a movement to the Y coordinate of the overflowed textbox (534) plus half the height of the overflowed textbox (534) in the positive direction.

The rendered page (555) is generated, in part, by vector summing transformation A and transformation B, and applying the resulting transformation to the positions (i.e., coordinates) of the characters in the intermediate page (548). In other words, the transformation relocates the characters in the intermediate page (548) into the positions matching the electronic document (532).

Those skilled in the art will appreciate that spacing commands (595) and (596) apply to different paragraphs (i.e. the first and second paragraphs) in the same textbox, and demonstrate that a single textbox may have a single vertical justification but may contain multiple paragraphs with different horizontal justifications. Those skilled in the art will also appreciate that the transformation may be applied to any position, justification, geometry, and arrangement of characters, paragraphs, and text in relation to border elements such as a textbox. For instance, text that is rotated at a 45 degree angle to the vertical axis (i.e. a rotation factor), and thus resides within and overflows an overflowed textbox that is rotated at a 45 degree angle to the vertical axis, may be transformed according to the same procedure. Those skilled in the art will appreciate that such text may begin the transformation from any rotated or otherwise configured state, and the transformation will result in a rendered page with exactly the same configuration as the starting electronic document. Many other such mechanisms may be employed to position characters, paragraphs and/or text.

Embodiments of the invention have one or more of the following advantages: the ability to render pages having overflowed textboxes using layout engines that are designed to process confined textboxes; including the ability to handle multiple horizontally justified paragraphs within a single textbox using horizontal spacing commands of the layout engine; the ability to select POIs and corresponding reference points based on the vertical justification of the text, etc.

Figure 6:
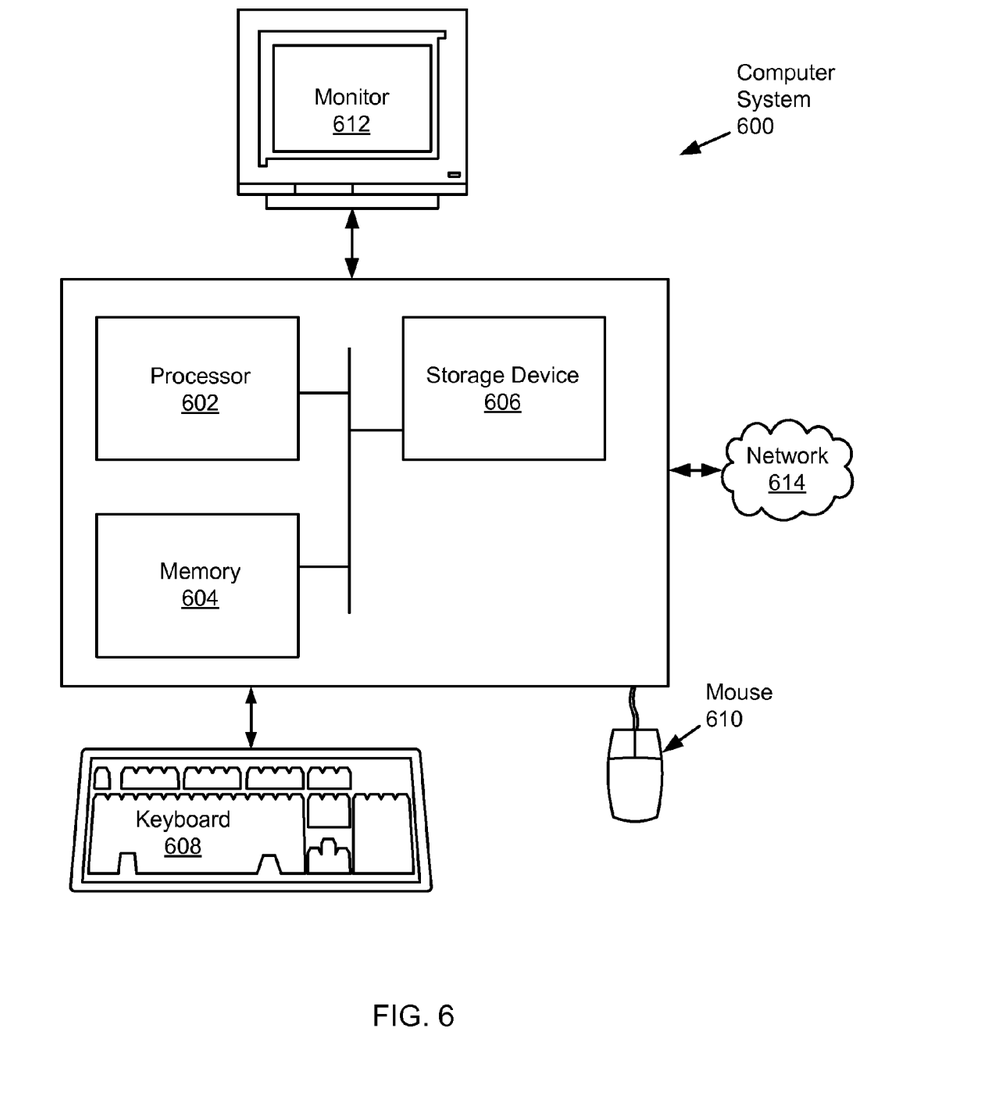
FIG. 6 shows a computer system in accordance with one or more embodiments of the invention.

Embodiments of the invention may be implemented on virtually any type of computer regardless of the platform being used. For example, as shown in FIG. 6, computer system (600) includes one or more processor(s) (602), associated memory (604) (e.g. random access memory (RAM), cache memory, flash memory, etc.), storage device (606) (e.g. a hard disk, an optical drive such as a compact disk drive or digital video disk (DVD) drive, a flash memory stick, etc.), and numerous other elements and functionalities typical of today's computers (not shown). In one or more embodiments of the invention, processor (602) is hardware. For example, the processor may be an integrated circuit, central processing unit (CPU) or other hardware processor. Computer system (600) may also include input means, such as keyboard (608), mouse (610), or a microphone (not shown). Further, computer system (600) may include output means, such as monitor (612) (e.g. a liquid crystal display (LCD), a plasma display, or cathode ray tube (CRT) monitor). Computer system (600) may be connected to network (614) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (600) includes at least the minimal processing, input, and/or output means necessary to practice embodiments of the invention.

Further, in one or more embodiments of the invention, one or more elements of the aforementioned computer system (600) may be located at a remote location and connected to the other elements over a network. Further, embodiments of the invention may be implemented on a distributed system having a plurality of nodes, where each portion of the invention (e.g. mapping engine (130), converter module (135), layout engine (140)) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing electronic documents (EDs), comprising:
obtaining an ED defining an overflowed textbox with a vertical justification, a paragraph for the overflowed textbox, and a horizontal justification of the paragraph, wherein the paragraph comprises a plurality of characters;
generating, based on the ED and for input to a layout engine, an intermediate document (ID) defining an enlarged textbox encapsulating the paragraph with the horizontal justification;
calculating, using the layout engine and based on the ID, a plurality of positions of the plurality of characters within the enlarged textbox by generating an intermediate page comprising the enlarged textbox;
calculating, based on the vertical justification of the overflowed textbox, a transformation between a point of interest (POI) associated with the enlarged textbox on the intermediate page and a reference point associated with the overflowed textbox; and
generating a rendered page comprising the overflowed textbox of the ED by applying the transformation to the plurality of positions of the plurality of characters,
wherein the overflowed textbox on the rendered page comprises a perimeter, and
wherein at least one of the plurality of characters on the rendered page is located outside the perimeter of the overflowed textbox.

2. The method of claim 1, wherein the ED and overflowed textbox are defined using an extensible markup language.

3. The method of claim 1, wherein generating the ID comprises:
inserting, in the ID, a spacing command associated with the paragraph and based on the horizontal justification of the paragraph,
wherein the layout engine uses the spacing command to calculate the plurality of positions.

4. The method of claim 3, further comprising:
calculating a difference between a width of the enlarged textbox and a width of the overflowed textbox; and
calculating a half of the difference,
wherein the spacing command includes the half of the difference as a parameter.

5. The method of claim 1, wherein calculating the transformation comprises:
calculating a first intermediate transformation from the POI associated with the enlarged textbox to an origin of the intermediate page;
calculating a second intermediate transformation from an origin of the ED to the reference point; and
summing the first intermediate transformation and the second intermediate transformation.

6. The method of claim 5, wherein the ED comprises a rotation factor, and wherein the overflowed textbox and the enlarged textbox are rotated by the rotation factor.

7. The method of claim 5, wherein calculating the first intermediate transformation comprises:
identifying a height of the enlarged textbox;
calculating a half of the height of the enlarged textbox; and
negating the half of the height of the enlarged textbox,
wherein the justification is middle justification.

8. The method of claim 5, wherein calculating the second intermediate transformation comprises:
identifying a height of the overflowed textbox; and
summing a vertical position of the overflowed textbox with the height of the overflowed textbox,
wherein the justification is bottom justification.

9. The method of claim 5, wherein calculating the first intermediate transformation comprises:
identifying a width of the enlarged textbox;
calculating a half of the width of the enlarged textbox; and
negating the half of the width of the enlarged textbox.

10. The method of claim 9, wherein calculating the second intermediate transformation comprises:
identifying a width of the overflowed textbox;
calculating a half of the width of the overflowed textbox; and
summing a horizontal position of the textbox with the half of the width of the overflowed textbox.

11. A non-transitory computer readable storage medium storing instructions for managing electronic documents (EDs), the instructions comprising functionality to:
obtain an ED defining an overflowed textbox with a vertical justification, a paragraph for the overflowed textbox, and a horizontal justification for the paragraph within the overflowed textbox, wherein the paragraph comprises a plurality of characters;
generate, based on the ED and for input to a layout engine, an intermediate document (ID) defining an enlarged textbox encapsulating the paragraph with the horizontal justification;
calculate, using the layout engine and based on the ID, a plurality of positions of the plurality of characters within the enlarged textbox by generating an intermediate page comprising the enlarged textbox;
calculate, based on the vertical justification of the overflowed textbox, a transformation between a point of interest (POI) associated with the enlarged textbox on the intermediate page and a reference point associated with the overflowed textbox; and
generate a rendered page comprising the overflowed textbox of the ED by applying the transformation to the plurality of positions of the plurality of characters,
wherein the overflowed textbox on the rendered page comprises a perimeter, and
wherein at least one of the plurality of characters on the rendered page is located outside the perimeter of the overflowed textbox.

12. The non-transitory computer readable storage medium of claim 11, wherein the instructions to generate the ID comprise functionality to:
insert, in the ID, a spacing command associated with the paragraph and based on the horizontal justification of the paragraph,
wherein the layout engine uses the spacing command to calculate the plurality of positions.

13. The non-transitory computer readable storage medium of claim 12, the instructions further comprising functionality to:
calculate a difference between a width of the enlarged textbox and a width of the overflowed textbox; and
calculate a half of the difference,
wherein the spacing command includes the half of the difference as a parameter.

14. The non-transitory computer readable storage medium of claim 11, wherein the instructions to calculate the transformation comprise functionality to:

calculate a first intermediate transformation from the POI associated with the enlarged textbox to an origin of the intermediate page;

calculate a second intermediate transformation from an origin of the ED to the reference point; and sum the first intermediate transformation and the second intermediate transformation.

15. The non-transitory computer readable storage medium of claim 14, wherein the ED comprises a rotation factor, and wherein the overflowed textbox and the enlarged textbox are rotated by the rotation factor.

16. A system for managing electronic documents (EDs), comprising:

a hardware processor;

a converter module executing on the hardware processor and configured to:

obtain an ED defining an overflowed textbox with a vertical justification, a paragraph for the overflowed textbox, and a horizontal justification for the paragraph within the overflowed textbox, wherein the paragraph comprises a plurality of characters; and generate, based on the ED and for input to a layout engine, an intermediate document (ID) defining an enlarged textbox encapsulating the paragraph with the horizontal justification;

a layout engine executing on the hardware processor and configured to calculate a plurality of position of the plurality of characters within the enlarged textbox by generating an intermediate page comprising the enlarged textbox; and a mapping engine executing on the hardware processor and configured to calculate, based on the vertical justification of the overflowed textbox, a transformation between a point of interest (POI) associated with the enlarged textbox on the intermediate page and a reference point associated with the overflowed textbox, wherein the layout engine is further configured to generate a rendered page comprising the overflowed textbox of the ED by applying the transformation to the plurality of positions of the plurality of characters, wherein the overflowed textbox on the rendered page comprises a perimeter, and wherein at least one of the plurality of characters on the rendered page is located outside the perimeter of the overflowed textbox.

17. The system of claim 16, wherein the converter module, the layout engine, and the mapping engine are located on a printer.

18. The system of claim 16, wherein generation of the ID comprises:

inserting, in the ID, a spacing command associated with the paragraph and based on the horizontal justification of the paragraph, wherein the layout engine uses the spacing command to calculate the plurality of positions.

19. The system of claim 16, wherein generation of the ID further comprises:

calculating a difference between a width of the enlarged textbox and a width of the overflowed textbox; and calculating a half of the difference, wherein the spacing command includes the half of the difference as a parameter.

20. The system of claim 16, wherein calculating the transformation comprises:

calculating a first intermediate transformation from the POI associated with the enlarged textbox to an origin of the intermediate page;

calculating a second intermediate transformation from an origin of the ED to the reference point; and summing the first intermediate transformation and the second intermediate transformation.

\* \* \* \* \*